United States Patent
Lamb et al.

(10) Patent No.: US 10,926,421 B2
(45) Date of Patent: *Feb. 23, 2021

(54) FLUID AND CABLE MANAGEMENT ADAPTER FOR DELIVERING UTILITIES TO AN OPERABLE MACHINE COMPONENT

(71) Applicant: Integrated Packaging Machinery, LLC, Rockford, MI (US)

(72) Inventors: Paul Lamb, Rockford, MI (US); Alexander Hastings, Grand Rapids, MI (US); Luke Stauffer, Rockford, MI (US)

(73) Assignee: Integrated Packaging Machinery, LLC, Rockford, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/864,901

(22) Filed: May 1, 2020

(65) Prior Publication Data

US 2020/0254632 A1 Aug. 13, 2020

Related U.S. Application Data

(63) Continuation of application No. 15/684,028, filed on Aug. 23, 2017, now Pat. No. 10,675,770.

(51) Int. Cl.
*B25J 18/04* (2006.01)
*B25J 19/00* (2006.01)
(Continued)

(52) U.S. Cl.
CPC .......... *B25J 19/0041* (2013.01); *B25J 18/04* (2013.01); *B25J 19/0029* (2013.01); *B25J 18/06* (2013.01); *H01R 13/005* (2013.01); *H01R 35/025* (2013.01)

(58) Field of Classification Search
CPC .... B25J 19/0041; B25J 18/04; B25J 19/0029; B25J 18/06; B25J 19/0025; H01R 13/005;
(Continued)

(56) References Cited

U.S. PATENT DOCUMENTS

| | | | | |
|---|---|---|---|---|
| 4,499,341 A | * | 2/1985 | Boyd ................. | B65H 75/4449 191/12.4 |
| 4,542,858 A | * | 9/1985 | Manges ............... | B25J 19/0029 174/86 |

(Continued)

FOREIGN PATENT DOCUMENTS

| DE | 102011000097 | 9/2011 |
|---|---|---|
| WO | 0143240 | 6/2001 |

(Continued)

*Primary Examiner* — Jake Cook
*Assistant Examiner* — Gregory Robert Weber
(74) *Attorney, Agent, or Firm* — Price Heneveld LLP (57) ABSTRACT

A material delivery interface includes a fixed assembly that is coupled to a primary structural attachment. The fixed assembly includes a fluid inlet and a wired input, wherein the fixed assembly defines a central axis. A rotational assembly is rotationally coupled to the fixed assembly and that rotates about the central axis with respect to the fixed assembly. The rotational assembly includes an inner portion having a fluid outlet in fluid communication with the fluid inlet and an outer portion having a wired output, wherein a conduit extends from the wired input to the wired output.

20 Claims, 10 Drawing Sheets

(51) Int. Cl.
*H01R 35/02* (2006.01)
*H01R 13/00* (2006.01)
*B25J 18/06* (2006.01)

(58) Field of Classification Search
CPC .. H01R 35/025; H01R 35/04; Y10T 74/20311
See application file for complete search history.

(56) References Cited

U.S. PATENT DOCUMENTS

| | | | |
|---|---|---|---|
| 5,224,871 A | 7/1993 | Ida | |
| 5,655,919 A * | 8/1997 | Ishikawa | B60R 16/027 439/15 |
| 6,217,355 B1 | 4/2001 | Charnock | |
| 7,037,126 B2 | 5/2006 | Tsutsumi et al. | |
| 7,147,062 B2 | 12/2006 | Kolacz et al. | |
| 7,559,590 B1 | 7/2009 | Jones | |
| 7,765,890 B2 | 8/2010 | Inoue et al. | |
| 8,414,303 B2 * | 4/2013 | Nakamura | B25J 19/0029 439/15 |
| 8,528,955 B2 * | 9/2013 | Robinson | B25J 19/0025 294/213 |
| 8,751,046 B2 | 6/2014 | Hartmann | |
| 8,920,103 B2 | 12/2014 | Schaller et al. | |
| 9,302,397 B2 | 4/2016 | Kimoto | |
| 10,119,642 B2 * | 11/2018 | Girtman | B25J 19/0041 |
| 2010/0097589 A1 | 4/2010 | Brinkhuis | |
| 2010/0313694 A1 | 12/2010 | Aoki | |
| 2013/0270399 A1 * | 10/2013 | Berkowitz | B25J 19/0029 248/70 |
| 2015/0128748 A1 | 5/2015 | Rueb | |

FOREIGN PATENT DOCUMENTS

| | | |
|---|---|---|
| WO | 02060655 | 8/2002 |
| WO | 20131179349 | 8/2013 |
| WO | 2013155032 | 10/2013 |
| WO | 2013169544 | 11/2013 |

\* cited by examiner

FLUID AND CABLE MANAGEMENT ADAPTER FOR DELIVERING UTILITIES TO AN OPERABLE MACHINE COMPONENT

CROSS-REFERENCE TO RELATED APPLICATION

This application is a continuation of U.S. patent application Ser. No. 15/684,028, filed Aug. 23, 2017, and entitled FLUID AND CABLE MANAGEMENT ADAPTER FOR DELIVERING UTILITIES TO AN OPERABLE MACHINE COMPONENT, the entire disclosure of which is incorporated herein by reference.

FIELD OF THE INVENTION

The present invention generally relates to management systems for delivering utilities to a robotics component. More specifically, the present invention relates to a fluid and cable management system for delivering utilities to a multi-directional robotics component.

BACKGROUND OF THE INVENTION

In robotic assemblies, the end of a robotics arm can be used for performing various functions. Typically, one or more utilities, such as fluid, electric current, air or combinations thereof, need to be delivered to these robotics assemblies. These utilities are delivered to these robotics assemblies while also allowing for movement of robotics assemblies to perform their particular function. Such movement of these robotics assemblies can include rotation, vertical adjustment, lateral adjustment and other similar movements.

SUMMARY OF THE INVENTION

According to one aspect of the present invention, a material delivery interface includes a central fluid hub having an outer fixed portion and an inner rotating portion. A fluid channel is continually defined between the outer fixed and inner rotating portions. A cable assembly includes a stationary member coupled to the fixed outer portion of the central fluid hub and a rotating disk that is configured to rotationally operate cooperatively with the rotating inner portion. The rotating disk and the inner rotating portion rotate cooperatively relative to the outer fixed portion. An upper connection of the outer fixed portion is configured to be fixedly attached to a utility delivery apparatus for delivering a fluid material to the fluid channel and at least an electrical current to the cable assembly. The inner rotating portion includes a lower connection and the rotating disk. The lower connection is configured to connect to a robotic apparatus that utilizes the fluid material and the electrical current, wherein the lower connection rotationally operates relative to the upper connection.

According to another aspect of the present invention, a material delivery interface includes a fixed assembly that is coupled to a primary structural attachment. The fixed assembly includes a fluid inlet and a wired input, wherein the fixed assembly defines a central axis. A rotational assembly is rotationally coupled to the fixed assembly and rotates about the central axis with respect to the fixed assembly. The rotational assembly includes an inner portion having a fluid outlet in fluid communication with the fluid inlet and an outer portion having a wired output, wherein a conduit extends from the wired input to the wired output.

According to another aspect of the present invention, a material delivery interface includes a fixed assembly that is coupled to a primary structural attachment. The fixed assembly includes a wired input, and the fixed assembly defines a central axis. A rotational assembly is rotationally coupled to the fixed assembly and rotates about the central axis with respect to the fixed assembly. The rotational assembly includes an inner portion that rotates within the fixed assembly. The rotational assembly includes a rotating disk having a wired output, wherein a conduit extends from the wired input to the wired output. A spirally wound divider extends in a coiled configuration within the rotating disk of the rotational assembly. The spirally wound divider is coupled to the fixed assembly at a first divider end and is coupled to the rotating disk at a second divider end at the wired output. The spirally wound divider defines a continuous spiral cavity within the rotating disk. The spirally wound divider is fixed only at the first and second divider ends and is slidably operable within the rotating disk to define a flexible configuration of the continuous spiral cavity.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
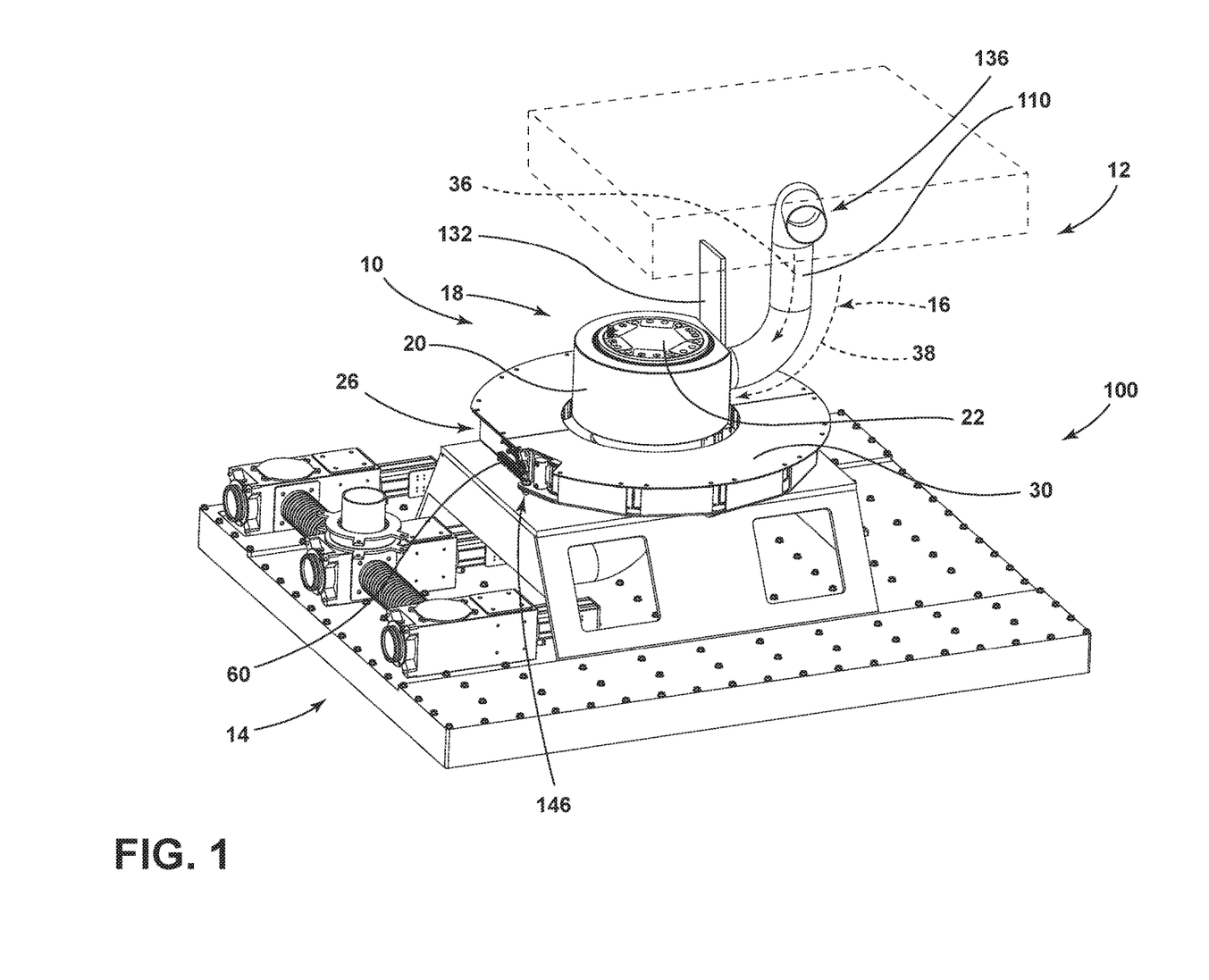
FIG. 1 is a side perspective view of an aspect of a material delivery interface disposed on a multi-directional robotics assembly.
Figure 2:
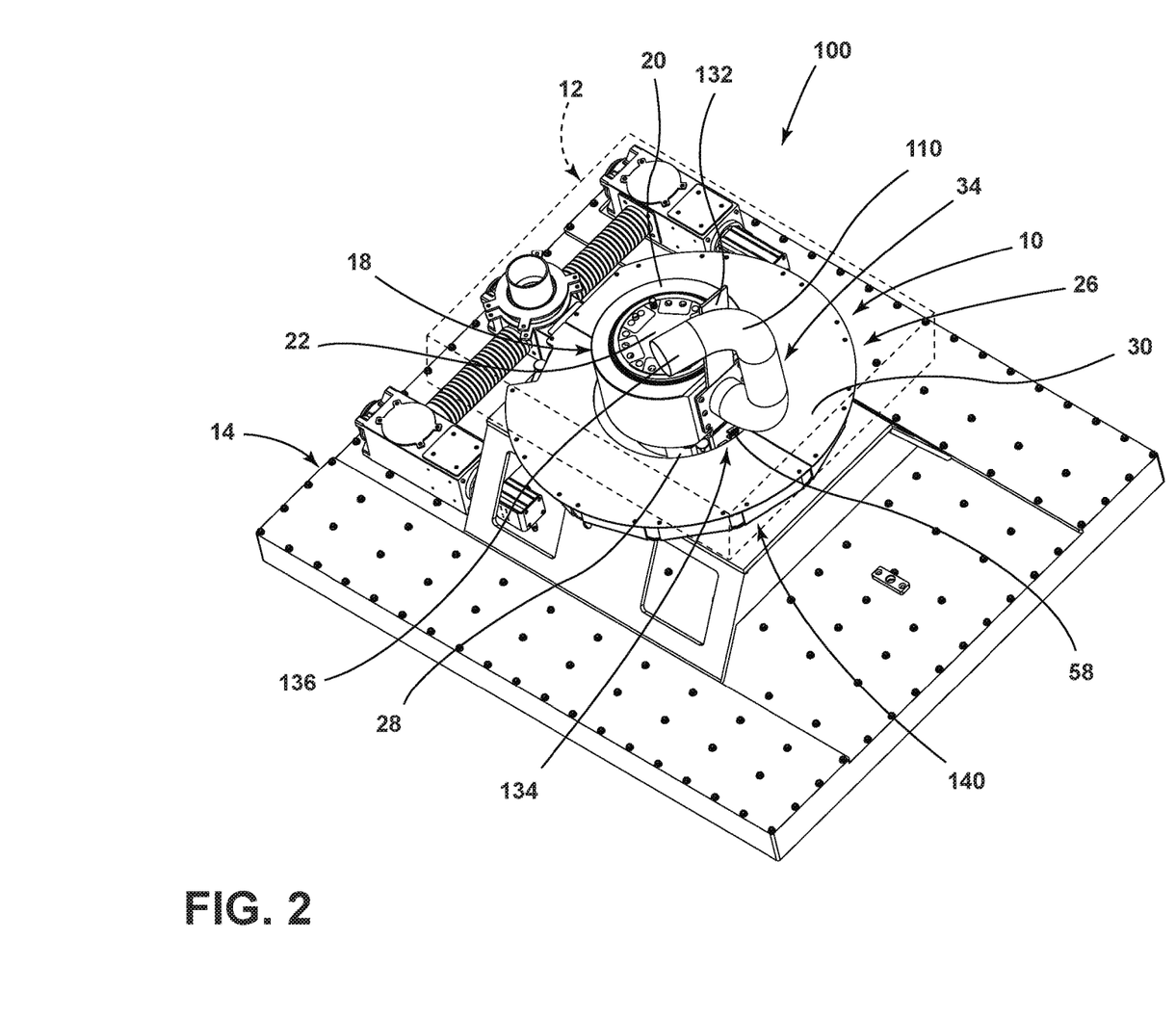
FIG. 2 is a top perspective view of the material delivery interface of FIG. 1.
Figure 3:
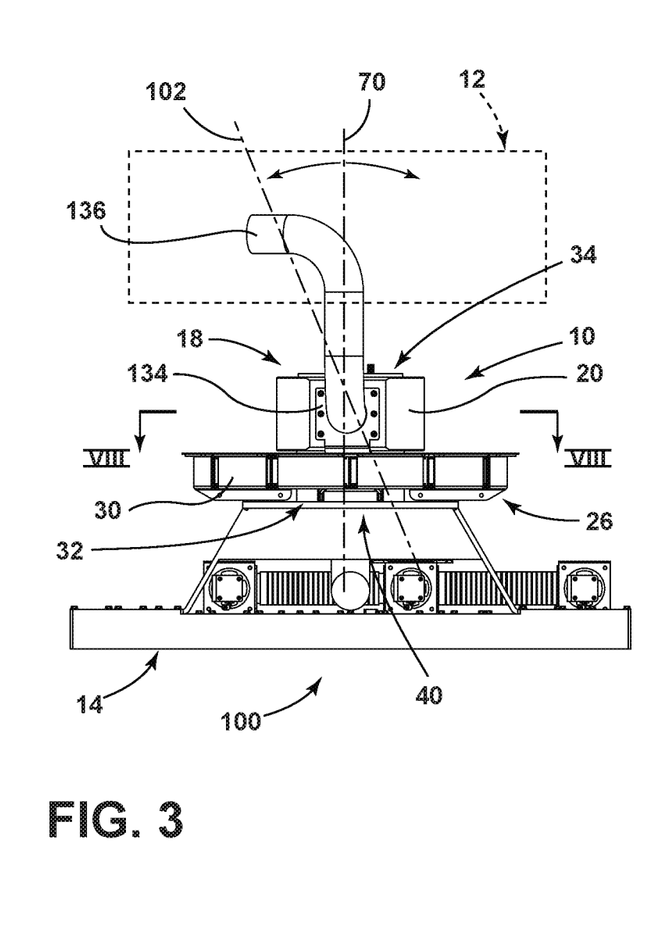
FIG. 3 is a first side elevational view of the material delivery interface of FIG. 1.
Figure 4:
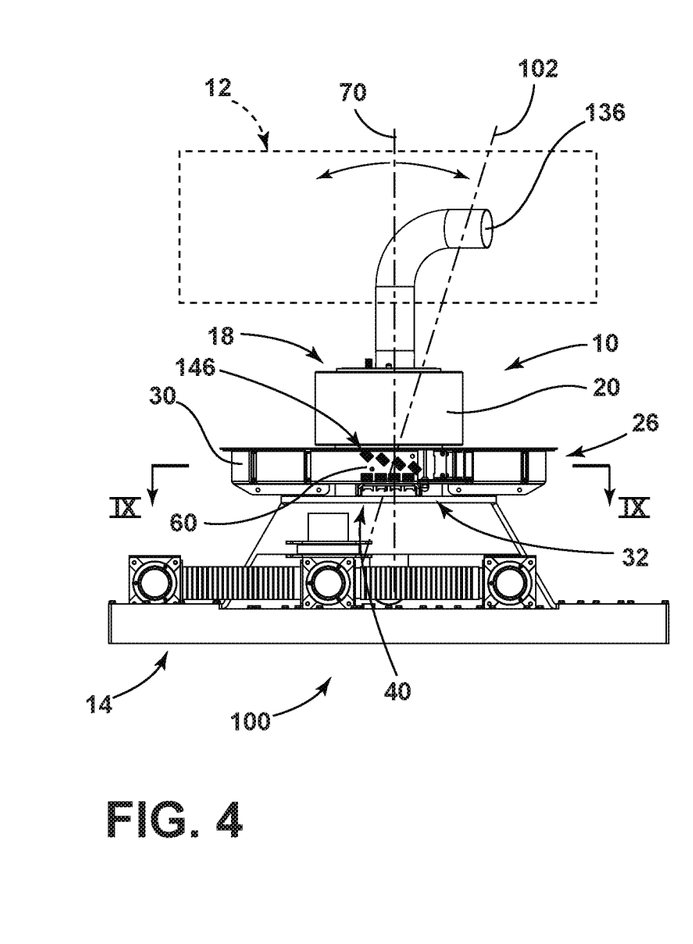
FIG. 4 is another side elevational view of the material delivery interface of FIG. 1.
Figure 5:
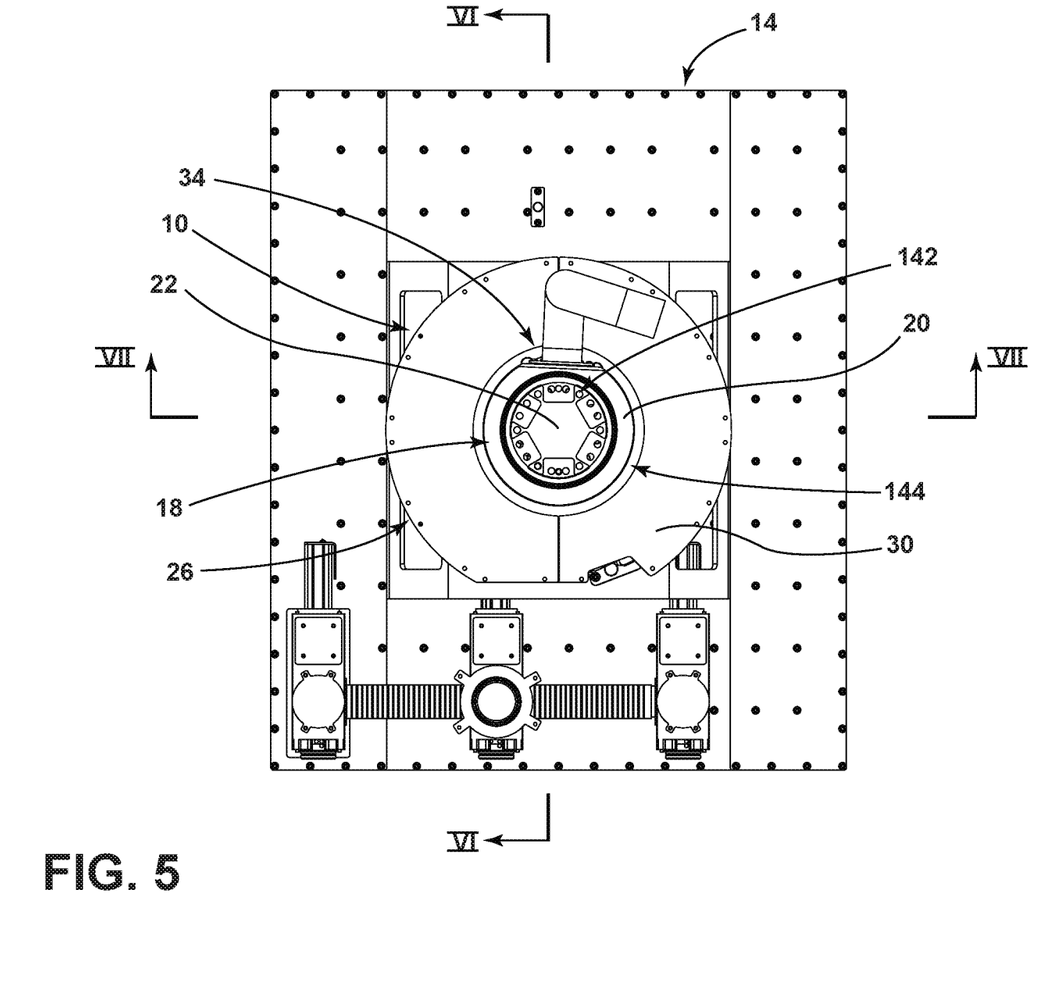
FIG. 5 is a top plan view of the material delivery interface of FIG. 1.
Figure 6:
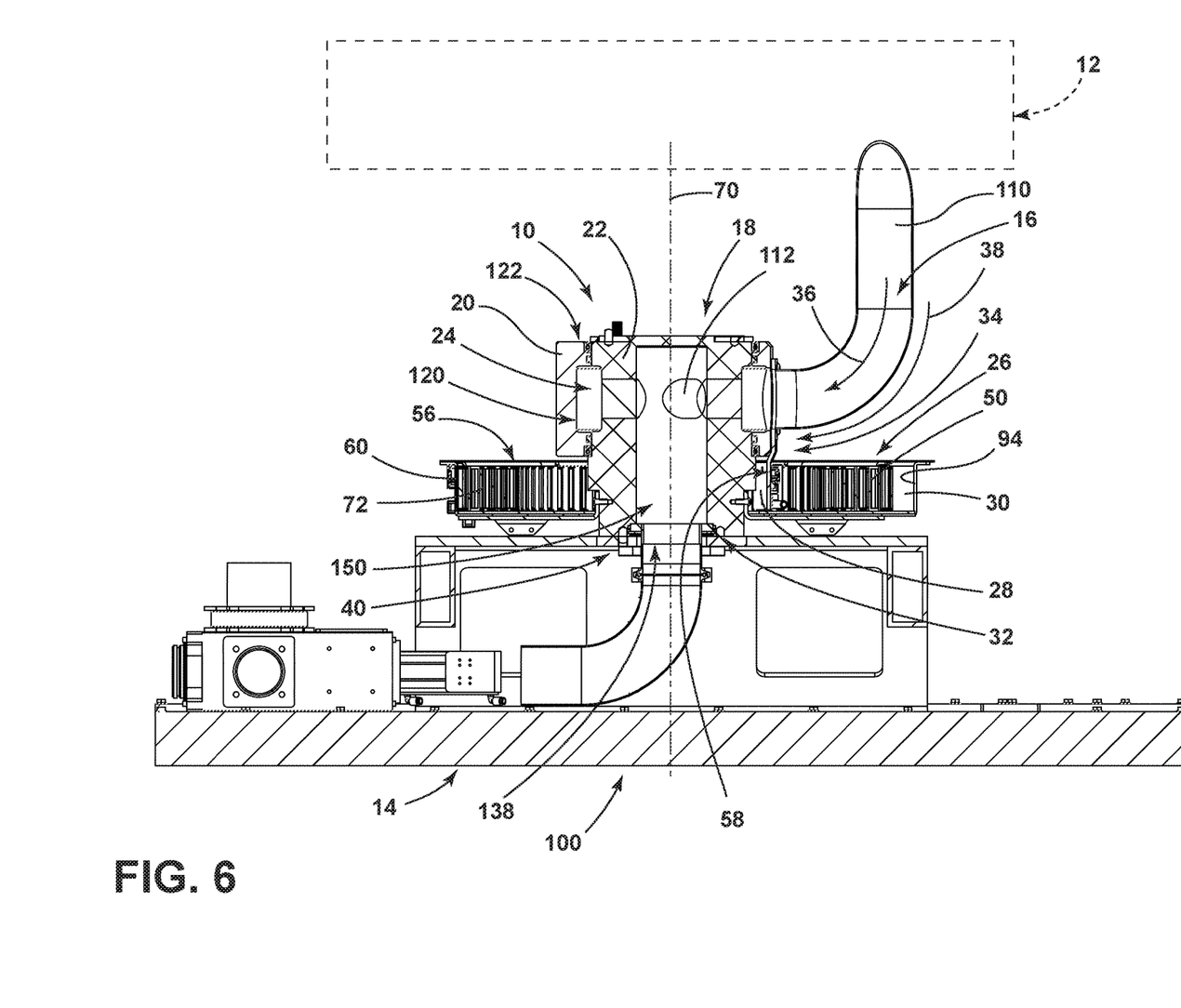
FIG. 6 is a cross-sectional view of the material delivery interface of FIG. 5, taken along line VI-VI.
Figure 7:
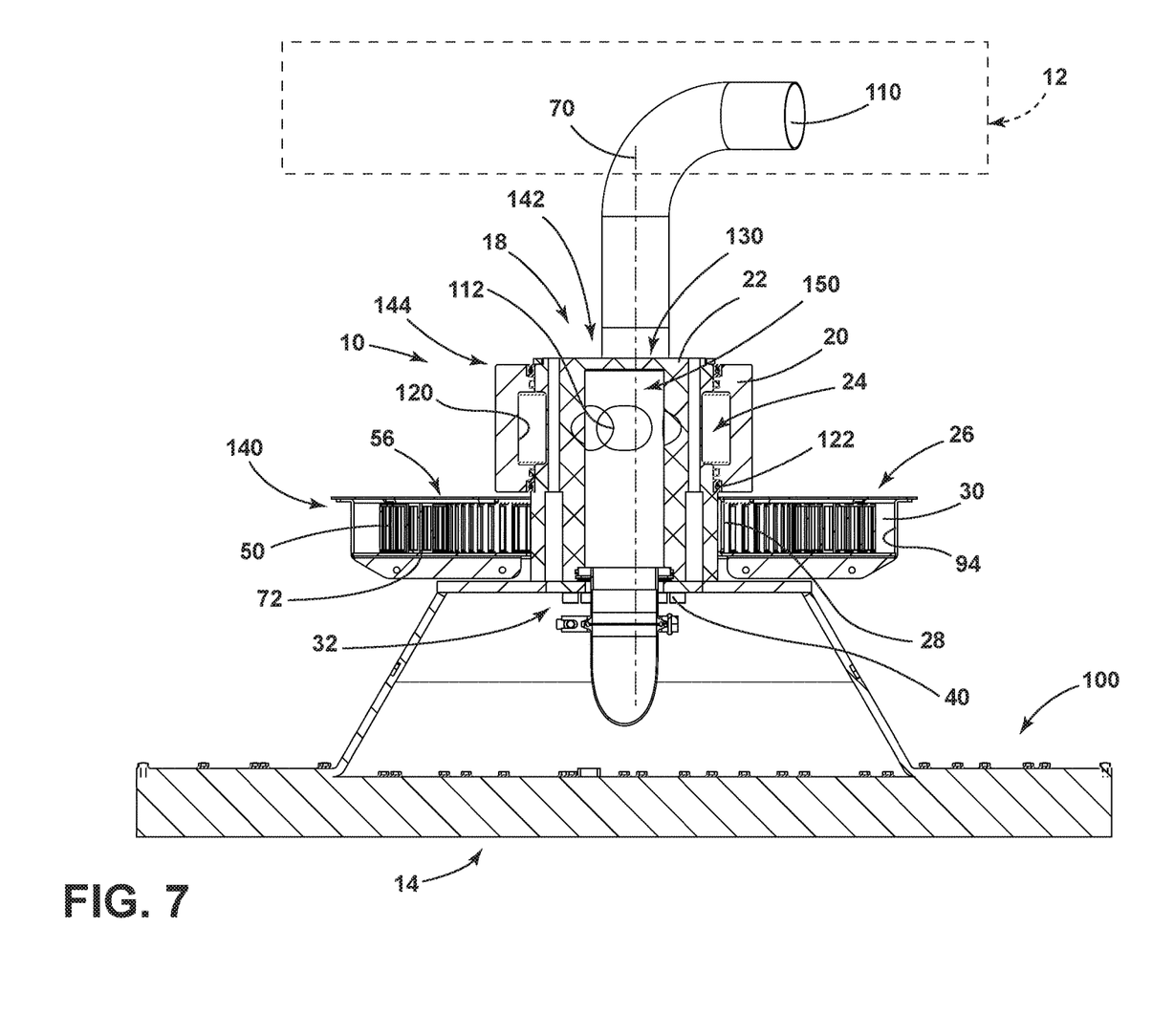
FIG. 7 is a cross-sectional view of the material delivery interface of FIG. 5, taken along line VII-VII.
Figure 8:
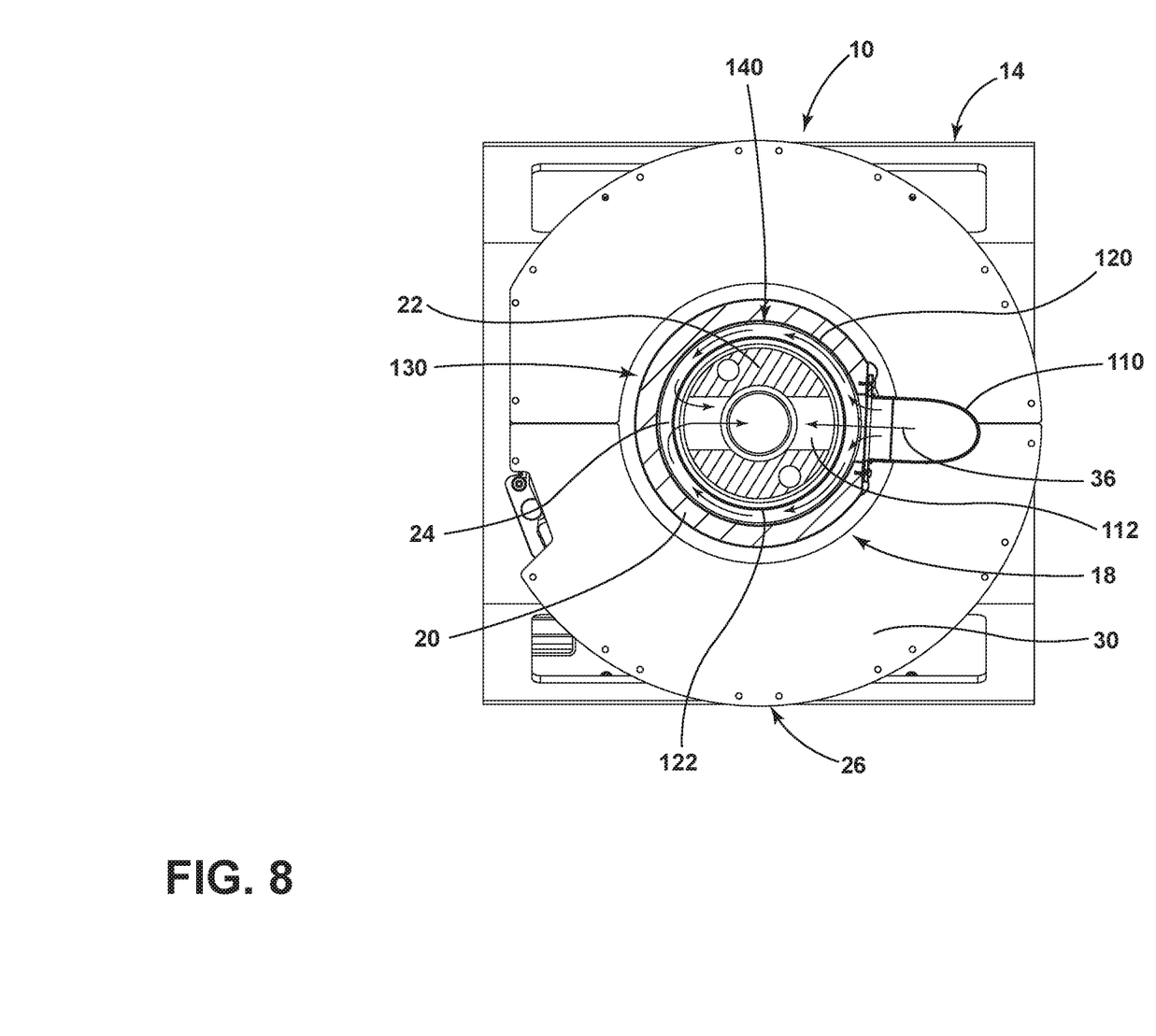
FIG. 8 is a cross-sectional view of the material delivery interface of FIG. 3, taken along line VIII-VIII.
Figure 9:
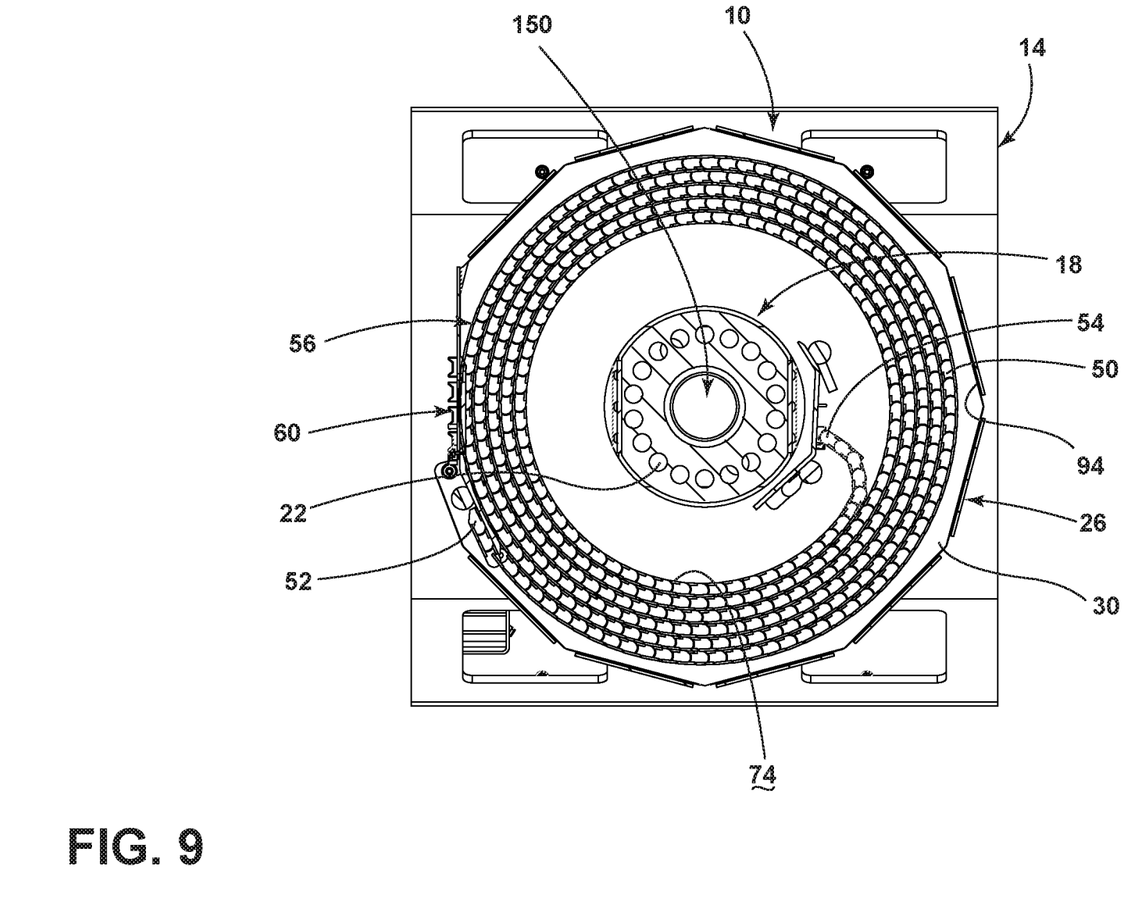
FIG. 9 is a cross-sectional view of the material delivery interface of FIG. 4, taken along line IX-IX.
Figure 10:
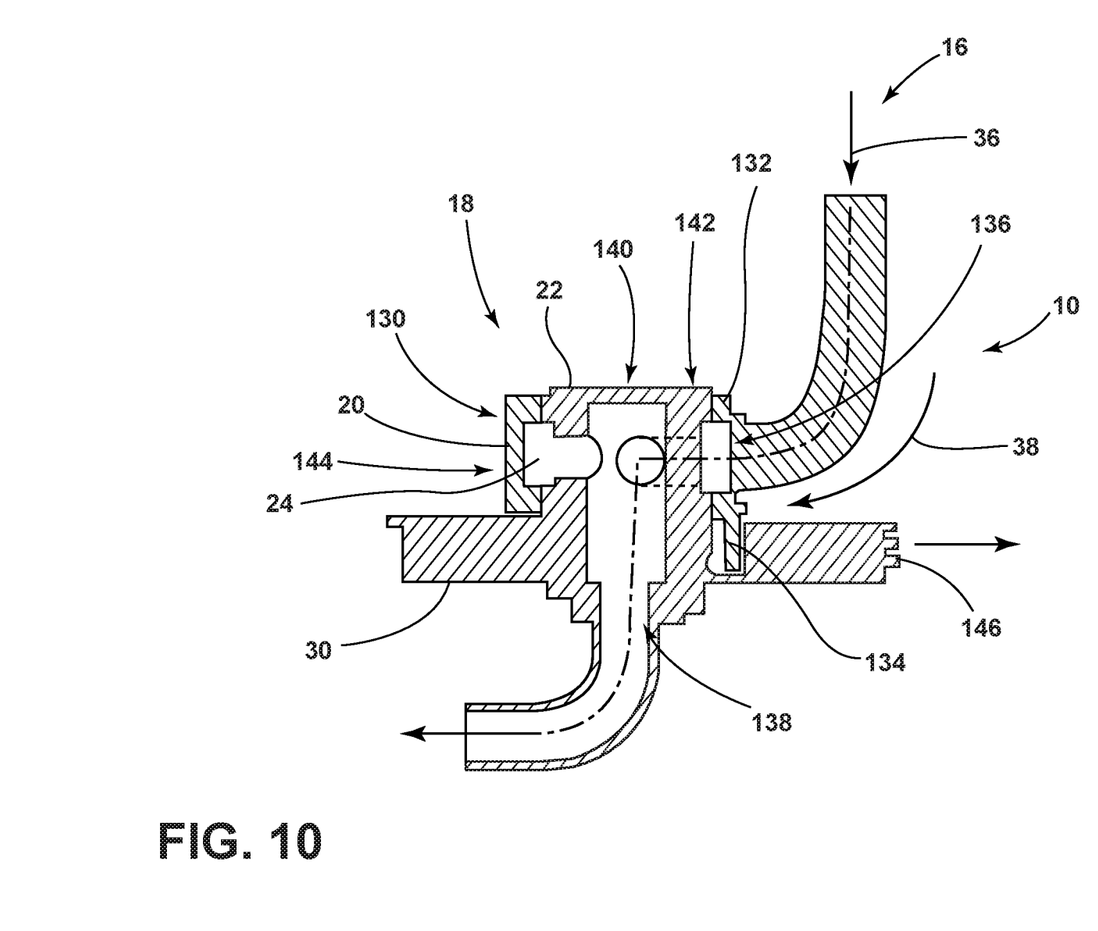
FIG. 10 is a schematic cross-sectional view of the fixed and rotational assemblies of an aspect of the material delivery interface for delivering utilities therethrough.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-9, reference numeral 10 generally refers to a material delivery interface that extends between a utility delivery apparatus 12 and a robotic apparatus 14. The material delivery interface 10 is adapted to allow for the delivery of utilities 16, such as fluid, air, electrical current 38, gas, vapor, and other utilities 16 from the utility delivery apparatus 12 to the robotic apparatus 14. Typically, the robotic apparatus 14 is movable in multiple directions relative to the utility delivery apparatus 12. In this manner, the material delivery interface 10 allows for the delivery of these utilities 16 through an operable joint, in the form of the material delivery interface 10, that allows for movement of the robotic apparatus 14 while not impeding the delivery of the utilities 16 from the utility delivery apparatus 12.

In various aspects of the device, the material delivery interface 10 includes a central fluid hub 18 having an outer fixed portion 20 and an inner rotating portion 22. A fluid channel 24 is continually defined between the outer fixed and inner rotating portions 20, 22. A cable assembly 26 is included within the material delivery interface 10, where the cable assembly 26 includes a stationary member 28 that is coupled to the fixed outer portion 144 of the central fluid hub 18. A rotating disk 30 of the cable assembly 26 is configured to rotationally operate cooperatively with the rotating inner portion 142.

According to various aspects of the device, the rotating disk 30 and the inner rotating portion 22 rotate cooperatively relative to the outer fixed portion 20. The rotating disk 30 and the inner rotating portion 22 can be fixedly connected to one another. Alternatively, the rotating disk 30 and the inner rotating portion 22 can be attached to the robotic apparatus 14 at a common connection 32 so that the inner rotating portion 22 and rotating disk 30 operate in unison as the common connection 32 rotates relative to the outer fixed portion 20 of the material delivery interface 10. An upper connection 34 of the outer fixed portion 20 is configured to be fixedly attached to the utility delivery apparatus 12. This upper connection 34 allows for the delivery of a fluid material 36 to the fluid channel 24 and ultimately to the robotic apparatus 14. The upper connection 34 also allows for the delivery of at least an electrical current 38 to the cable assembly 26 and then to the robotic apparatus 14. A lower connection 40 of the inner rotating portion 22 and the rotating disk 30 is configured to connect to the robotic apparatus 14. As discussed previously, the robotic apparatus 14 utilizes the utilities 16 delivered by the utility delivery apparatus 12. It is contemplated that the lower connection 40 rotationally operates relative to the upper connection 34. In this manner, the robotic apparatus 14 can operate, at least rotationally, relative to the utility delivery apparatus 12 without impeding the delivery of the utilities 16 therethrough.

Referring again to FIGS. 1-13, the rotating disk 30 can include a spirally wound divider 50 that extends in a coiled configuration within the cable assembly 26. The spirally wound divider 50 is coupled to the stationary member 28 at the first divider end 52 and to the rotating disk 30 at a second divider end 54 to define a continuous spiral cavity 56 therebetween. The spiral cavity 56 can include a stationary wire interface 58 at the first divider end 52 and proximate the stationary member 28 of the cable assembly 26. The spiral cavity 56 also includes a rotating wire interface 60 at the second divider end 54 at a portion of the rotating disk 30.

During operation of the rotating disk 30 about a central axis 70 of the material delivery interface 10, as exemplified in FIGS. 9 and 11-13, the spirally wound divider 50 has a consistent length that does not change. Accordingly, the second divider end 54 of the spirally wound divider 50 rotates about the first divider end 52. The spirally wound divider 50 is made of a low-friction material that allows the spirally wound divider 50 to slidably operate within the rotating disk 30 to define a flexible configuration of the continuous spiral cavity 56. Typically, a cable, tube, or other similar conduit 72 is disposed within the continuous spiral cavity 56 formed by the spirally wound divider 50. As the rotating disk 30 operates about the central axis 70, the spirally wound divider 50 manipulates the configuration of the spiral cavity 56 and also the conduit 72 disposed therein. This configuration allows the spirally wound divider 50 and the conduit 72 disposed within the continuous spiral cavity 56 to wrap around the stationary member 28 of the cable assembly 26. At the same time, the spirally wound divider 50 having the low-friction surface 74 prevents the conduit 72 from rubbing against itself. Rather, the conduit 72 rubs against or otherwise engages the low-friction surface 74 of the spirally wound divider 50 so that the conduit 72 does not bind up against itself as the rotating disk 30 is manipulated in both clockwise and counterclockwise directions. Additionally, because the spirally wound divider 50 and the conduit 72 each maintain a consistent length as the rotating disk 30 is manipulated about the central axis 70, the spirally wound divider 50 prevents any engagement between one portion of the conduit 72 and another portion of the conduit 72. Accordingly, wrinkling, twisting, overlapping, knotting, and other similar conditions that might cause a binding up of the conduit 72 within the rotating disk 30 can be prevented.

Referring again to FIGS. 11-13, as the rotating disk 30 operates about the stationary member 28 and away from the rest position, the rotating disk 30 can be manipulated in either clockwise or counterclockwise directions. When operated in a first direction 80 representative of FIG. 12, the second divider end 54 wraps around the first divider end 52 and causes the spirally wound divider 50 to coil around the stationary member 28. Because the spirally wound divider 50 maintains a consistent length, the coiling of the spirally wound divider 50 causes an inward biasing force 82 where the spirally wound divider 50 and the conduit 72 disposed within the continuous spiral cavity 56 to be biased toward the stationary member 28. Even as the conduit 72 is biased toward the stationary member 28, the spirally wound divider 50 maintains a low-friction surface 74 that the conduit 72 can slidably operate against to prevent binding or other interference of the flow of material through the conduit 72.

Figure 13:
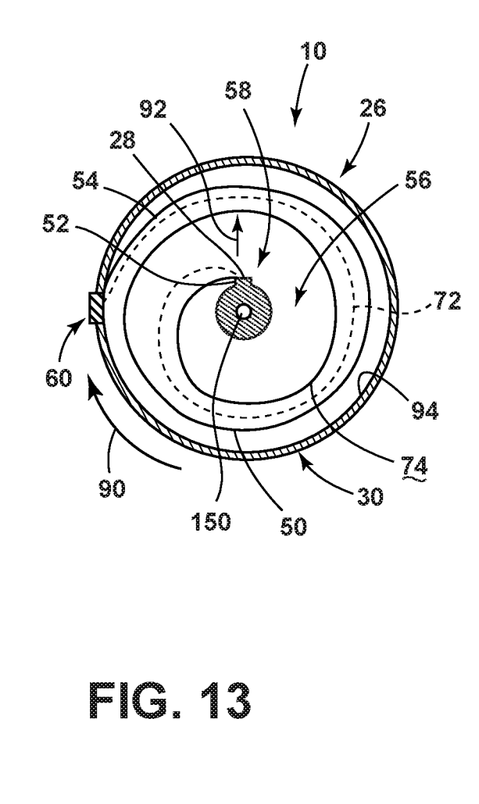
FIG. 13 is a schematic cross-sectional view of the cable assembly of FIG. 11 showing the cable assembly rotated in a second direction approximately 270° away from the rest position.

Conversely, when the rotating disk 30 is operated within a second direction 90 representative of FIG. 13, the second divider end 54 unwinds about the stationary member 28 of the cable assembly 26. Through this unwinding, the spirally wound divider 50 and the conduit 72 experience an outward biasing force 92 toward an outer perimeter 94 of the rotating disk 30. Again, because the conduit 72 and the spirally wound divider 50 have a consistent length, the outward biasing force 92 is generated that pushes the conduit 72 and the spirally wound divider 50 toward this outer perimeter 94 of the rotating disk 30. Because of the low-friction surface 74 of the spirally wound divider 50, the conduit 72 is prevented from binding during this rotational operation of the rotating disk 30 in each of the first and second directions 80, 90.

The amount of rotation afforded the rotating disk 30 about the central axis 70 can be dictated by the amount of space within the rotating disk 30 and the length of the spirally wound divider 50 disposed therein. Rotation in each of the first and second directions 80, 90 about the central axis 70 can have a limit where the length of spirally wound divider 50 and the length of the conduit 72 can prevent additional rotation in either the first or second directions 80, 90 of the rotating disk 30. Typically, this limit is approximately 360° of angular rotation in each of the clockwise and counter-clockwise directions to produce a full angular rotation of 720°. It should be contemplated that additional amount of angular rotation can be achieved through various configurations of the spirally wound divider 50 within the rotating disk 30.

In various aspects of the device, the rotating disk 30 can remain stationary. In such an embodiment, the inner rotating portion 22 can include the rotating wire interface 60. As the inner rotating portion 22 operates, the wound divider 50 and the conduit 72 are wound within the rotating disk 30 that includes the stationary wire interface 58. In this embodiment, the features and benefits of the wound divider 50 having the low-friction surface 74 are still achieved.

Figure 11:
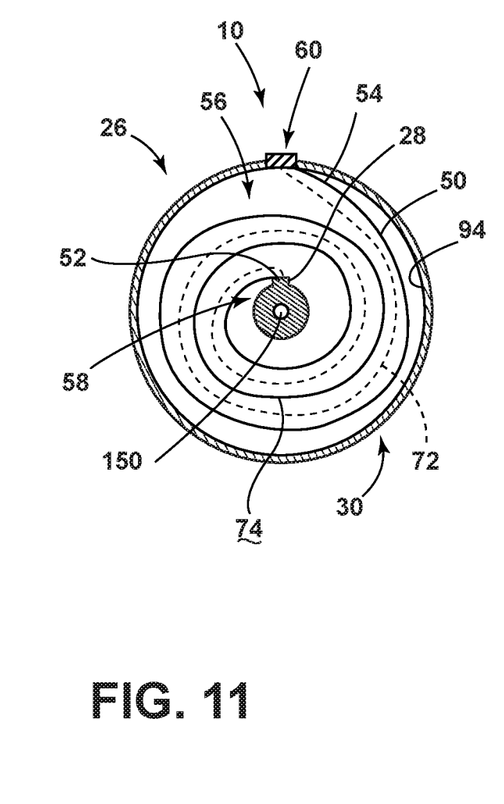
FIG. 11 is a schematic cross-sectional view of an aspect of a cable assembly showing the cable assembly in a rest position.
Figure 12:
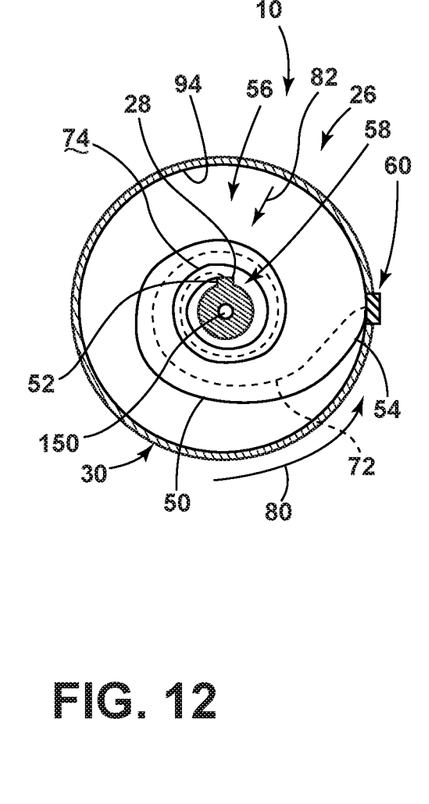
FIG. 12 is a schematic cross-sectional view of the cable assembly of FIG. 11 shown rotated in a first direction 270° away from the rest position.

As exemplified in the schematic representations of FIGS. 11-13, the spirally wound divider 50 is coiled in and around the stationary member 28 of the cable assembly 26 in a single direction. In various aspects of the device, the spirally wound divider 50 can be coiled in a single direction to a maximum extent and then uncoiled in the opposite direction such that the spirally wound divider 50 fully uncoils and then coils in the opposing direction to provide additional rotational movement of the rotating disk 30 relative to the stationary member 28 of the cable assembly 26. In the various configurations, the spirally wound divider 50 maintains a consistent length and prevents direct engagement between one portion of the conduit 72 and another portion of the conduit 72.

Through the use of the spirally wound divider 50, the material delivery interface 10 can be manipulated about the central axis 70 in various orientations. Typically, the central axis 70 of the material delivery interface 10 will be situated in a vertical orientation 100. Because the spirally wound divider 50 limits the binding of the conduit 72 disposed within the continuous spiral cavity 56, the central axis 70 of the material delivery interface 10 can be tipped, rotated, or otherwise manipulated, such that the rotating disk 30 operates in a non-horizontal plane 102.

According to various aspects of the device, the spirally wound divider 50 can be made of various low-friction materials. These low-friction materials can include, but are not limited to, HDPE, PTFE, POM, various forms of thermoplastic, combinations thereof, and other similar low-friction materials. These low-friction materials can also include metals, various polymers, resins, composite materials, combinations thereof, and other similar materials that can be disposed in a spirally wound configuration to form the continuous spiral cavity 56 within the rotating disk 30 of the cable assembly 26.

According to various aspects of the device, the continuous spiral cavity 56 formed by the spirally wound divider 50 within the rotating disk 30 can contain multiple conduits 72. As discussed above, these conduits 72 can be used for delivery of fluid material 36, positive gas delivery in the form of blowing air, negative gas delivery in the form of suction or vacuum generation, delivering electrical current 38, data transmission, lubricant delivery and other similar material delivery functions. In various aspects of the device, it is also contemplated that the rotating disk 30 can include more than one spirally wound divider 50. In such an embodiment, the multiple spirally wound dividers 50 can form multiple continuous spiral cavities that can each contain a separate conduit 72 or separate numbers of conduits 72 within the rotating disk 30.

In the various configurations, the conduit 72 disposed within the spiral cavity 56 is connected with the stationary interface of the stationary member 28 and the rotating interface of the rotating disk 30. In this manner, material and utilities 16 can be delivered therethrough without impeding operation of the robotic apparatus 14 or the delivery of utilities 16 from the utility delivery apparatus 12. Additionally, because the spirally wound divider 50 maintains a consistent length, a spiral length of a continuous spiral cavity 56 also remains substantially consistent during operation of the rotating disk 30 in each of the first and second directions 80, 90. As discussed previously, during rotation of the rotating disk 30 about the central fluid hub 18, the cable or conduit 72 disposed within the spiral cavity 56 engages the spirally wound divider 50 and each portion of the conduit 72 is substantially free of direct engagement with another portion of the conduit 72. In this manner, rotation of the rotating disk 30 defines a sliding engagement between the conduit 72 and the rotating disk 30.

Referring again to FIGS. 1-10, the central fluid hub 18 includes the outer fixed portion 20. This outer fixed portion 20 receives a fluid conduit 110 that can be attached to the utility delivery apparatus 12. This fluid conduit 110 extends through the outer fixed portion 20 and is in fluid communication with the fluid channel 24 defined between the outer fixed portion 20 and the inner rotating portion 22. Within the central fluid hub 18, at least one fluid channel 24 is defined between the outer fixed portion 20 and the inner rotating portion 22. Within the inner rotating portion 22, at least one interior conduit 112, and typically multiple interior conduits 112, extend from the fluid channel 24 and toward a bottom of the inner rotating portion 22. This interior conduit 112 extends downward through the inner rotating portion 22 and to the lower connection 40 where the interior conduit 112 can be connected with the robotic apparatus 14.

Referring again to FIGS. 6-10, the fluid channel 24 can be defined by a depression, recess 120, or other cut-out defined within each of the outer fixed portion 20 and the inner rotating portion 22. These mating recesses 120 can define the fluid channel 24 that extends around at least a portion of the inner rotating portion 22. The engagement between the outer fixed portion 20 and the inner rotating portion 22 at the fluid channel 24 can include a rotationally operable and sealed connection 122 that allows for movement of fluid material 36 through the fluid channel 24 without resulting in leakage from the fluid channel 24. This sealed connection 122 can include, but is not limited to, sealed bearings, slidable seals, labyrinth seals, sealing lubricant, and other similar sealing assemblies.

The engagement between the outer fixed portion 20 and the inner rotating portion 22 of the central fluid hub 18 is typically not limited as to the amount of rotation that can be provided and can provide for full rotation in both clockwise and counterclockwise directions.

In various aspects of the device, the fluid channel 24 can be defined by a flat surface defined within one of the outer fixed portion 20 of the inner rotating portion 22 and a recess 120 that is defined within the other of the inner rotating portion 22 and the outer fixed portion 20. In such an embodiment, it is contemplated that the fluid channel 24 can extend only partially around the inner rotating portion 22. The multiple interior conduits 112 that extend from the fluid channel 24 can be utilized regardless of the positioning of the inner rotating portion 22 with respect to the outer fixed portion 20. At least one of the conduits 72 and in some instances, multiple interior conduits 112 may continually be in communication with the fluid channel 24 and the fluid conduit 110.

Referring now to FIGS. 1-10, the material delivery interface 10 can include a fixed assembly 130 that is coupled to a primary structural attachment 132. The fixed assembly 130 includes a fluid at the fluid conduit 110 and a wired input 134 in the form of the stationary wire interface 58. Additionally, the fixed assembly 130 typically defines a central axis 70. A rotational assembly 140 is rotationally coupled to the fixed assembly 130. The rotational assembly 140 is configured to rotate about the central axis 70 with respect to the fixed assembly 130. The rotational assembly 140 includes an inner portion 142 having a fluid outlet 138 that is in fluid communication with the fluid inlet 136. An outer portion 144 of the rotational assembly 140 is configured to include a wired output 146. Typically, a conduit 72 extends from the wired input 134 to the wired output 146. According to various aspects of the device, a conduit 72 defined within the rotational assembly 140 is defined by the spirally wound divider 50 that extends through the rotational assembly 140 in the form of the rotating disk 30. The inner portion 142 of the rotational assembly 140 includes a central passage 150 that extends from the fluid channel 24 to the fluid outlet 138. As discussed previously, the fluid channel 24 is cooperatively defined between the fixed assembly 130 and an inner portion 142 of the rotational assembly 140. The conduit 72, which may be in the form of the spirally wound divider 50, extends in a coiled configuration within the rotating disk 30 of the rotational assembly 140. The spirally wound divider 50 is coupled to the fixed assembly 130 at a first divider end 52 and is coupled to the rotating disk 30 at the second divider end 54 at the wired output 146. The spirally wound divider 50 serves to define a continuous spiral cavity 56 within the rotating disk 30.

Referring again to FIGS. 1-13, the material delivery interface 10 can include the fixed assembly 130 that is coupled to a primary structural attachment 132. The fixed assembly 130 includes the wired input 134 and also includes a central axis 70. The rotational assembly 140 is rotationally coupled to the fixed assembly 130 to operate about the central axis 70 with respect to the fixed assembly 130. The rotational assembly 140 includes the inner portion 142 that rotates within the fixed assembly 130. The rotational assembly 140 also includes a rotating disk 30 having a wired output 146. The conduit 72, which may be in the form of a spirally wound divider 50, extends from the wired input 134 of the fixed assembly 130 to the wired output 146 of the rotating disk 30. The spirally wound divider 50 extends in a coiled configuration within the rotating disk 30 of the rotational assembly 140. The spirally wound divider 50 is coupled to the fixed assembly 130 at the first divider end 52 and is coupled to the rotating disk 30 at the second divider end 54 at the wired output 146. The spirally wound divider 50 defines a continuous spiral cavity 56 within the rotating disk 30. Additionally, the spirally wound divider 50 is fixed only at the first and second divider ends 52, 54 and is slidably operable within the rotating disk 30 to define a flexible configuration of the continuous spiral cavity 56. As discussed previously, the spirally wound divider 50 and the continuous spiral cavity 56 have a substantially consistent length as the rotating disk 30 operates about the central axis 70 in each of the clockwise and counterclockwise directions. This substantially consistent length serves to prevent binding, wrinkling, knotting, and other obstructions that might be caused through engagement of one portion of a conduit 72 with another portion of a conduit 72.

In various aspects of the device, the material delivery interface 10 can include each of the fluid channel 24 and the cable assembly 26. It is also contemplated that the material delivery interface 10 may include only one of the fluid channel 24 and cable assembly 26, depending upon the needs of the user and the configuration of the robotic apparatus 14 being served by the material delivery interface 10.

According to various aspects of the device, the robotic apparatus 14 can be any one of various manufacturing assemblies that can be used for product delivery, manufacturing, packaging, combinations thereof, and other similar functions. These robotic mechanisms can include, but are not limited to, palletizers, painting assemblies, pick-and-place assemblies, packaging assemblies, labeling assemblies, welding assemblies, and other similar robotic mechanisms.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A utility interface for a robotic assembly, the utility interface comprising:
   a central hub having a fixed portion and a rotating portion that operates to define a plurality of rotating positions;
   a cable assembly having a stationary member coupled to the fixed portion of the central hub and a rotating disk that is coupled with the rotating portion, wherein the rotating disk and the rotating portion rotate to define the plurality of rotating positions relative to the fixed portion;
   an upper connection of the fixed portion that is configured to be fixedly attached to a utility delivery apparatus for delivering at least an electrical current to the cable assembly;
   a lower connection of the rotating portion and the rotating disk, wherein the lower connection is configured to connect to a robotic apparatus that utilizes the electrical current, wherein the lower connection rotationally operates between the plurality of rotating positions relative to the upper connection; and
   a spirally wound divider that extends in a planar coiled configuration within the cable assembly, wherein the spirally wound divider slidably extends in a single rotational configuration and is coupled to the stationary member at a first divider end and to the rotating disk at a second divider end to define a continuous spiral cavity therebetween in each rotating position of the plurality of rotating positions, wherein a cable is wound within the continuous spiral cavity and is freely and slidably operable within the continuous spiral cavity relative to the spirally wound divider.

2. The utility interface of claim 1, wherein the fixed portion of the central hub is an outer fixed portion and the rotating portion is an inner rotating portion of the central hub.

3. The utility interface of claim 1, wherein the spirally wound divider is a solid and continuous member that is made of a low-friction material.

4. The utility interface of claim 1, wherein the continuous spiral cavity includes a stationary wire interface at the first divider end and a rotating wire interface at the second divider end.

5. The utility interface of claim 4, wherein the cable is wound within the continuous spiral cavity and is connected to the stationary and rotating wire interfaces.

6. The utility interface of claim 2, wherein rotation of the rotating disk in a first direction about the central hub causes an inward biasing force to be exerted by the spirally wound divider toward the outer fixed portion of the central hub, wherein the spirally wound divider is wound around the outer fixed portion.

7. The utility interface of claim 6, wherein rotation of the rotating disk in a second direction about the central hub causes an outward biasing force to be exerted by the spirally wound divider toward an outer perimeter of the rotating disk, wherein the spirally wound divider is at least partially unwound from around the outer fixed portion of the central hub, wherein the first direction is opposite the second direction.

8. The utility interface of claim 1, wherein during rotation of the rotating disk around the central hub, a spiral length of the continuous spiral cavity remains consistent.

9. The utility interface of claim 5, wherein during rotation of the rotating disk about the central hub, the cable disposed within the continuous spiral cavity engages the spirally wound divider and each portion of the cable is free of direct engagement with another portion of the cable, and wherein rotation of the rotating disk defines a sliding engagement between the cable and the rotating disk.

10. The utility interface of claim 1, wherein a conduit is wound within the cable assembly, the conduit extending between the stationary member and an outer perimeter of the rotating disk.

11. The utility interface of claim 10, wherein at least one cable is disposed within the conduit.

12. The utility interface of claim 1, wherein the rotating disk is configured to rotate about the central hub between a fully rotated clockwise position and a fully rotated counterclockwise position.

13. The utility interface of claim 12, wherein an angular distance between the fully rotated clockwise position and the fully rotated counterclockwise position is approximately 720 degrees.

14. A utility interface for a robotic assembly, the utility interface comprising:
a fixed assembly that is coupled to a primary structural attachment, wherein the fixed assembly includes a wired input, wherein the fixed assembly defines a central axis;
a rotational assembly that is rotationally coupled to the fixed assembly wherein the rotational assembly rotates about the central axis with respect to the fixed assembly, wherein the rotational assembly includes an inner portion having an outer portion having a wired output, and wherein a conduit extends from the wired input to the wired output; and
a spirally wound divider that defines the conduit as a continuous spiral cavity and extends in a planar coiled configuration in a single rotational orientation within a rotating disk of the rotational assembly, wherein
the spirally wound divider is coupled to the fixed assembly at a first divider end and is coupled to the rotating disk at a second divider end at the wired output,
rotation of the rotational assembly about the central axis in a first direction biases the spirally wound divider and the continuous spiral cavity in an outward direction,
rotation of the rotational assembly about the central axis in a second direction biases the spirally wound divider and the continuous spiral cavity in an inward direction, and
a cable assembly is slidably and freely operable within the continuous spiral cavity and relative to the spirally wound divider.

15. The utility interface of claim 14, wherein the inner portion and the fixed assembly cooperatively define a central hub, wherein a fluid channel is cooperatively defined between the fixed assembly and the inner portion.

16. The utility interface of claim 15, wherein the inner portion includes a central passage that extends from the fluid channel to a fluid outlet of the inner portion.

17. The utility interface of claim 14, wherein the rotating disk is configured to rotate about the central axis between a fully rotated clockwise position and a fully rotated counterclockwise position, and wherein an angular distance between the fully rotated clockwise position and the fully rotated counterclockwise position is approximately 720 degrees.

18. The utility interface of claim 14, wherein the spirally wound divider is fixed only at the first and second divider ends and is slidably operable within the rotating disk to define a flexible configuration of the continuous spiral cavity.

19. A utility interface for a robotic assembly, the utility interface comprising:
a fixed assembly that is coupled to a primary structural attachment, wherein the fixed assembly includes a wired input, and wherein the fixed assembly defines a central axis;
a rotational assembly that is rotationally coupled to the fixed assembly and that rotates about the central axis with respect to the fixed assembly, wherein the rotational assembly includes an inner portion that rotates within the fixed assembly, and includes a wired output, wherein a conduit extends from the wired input to the wired output; and
a spirally wound divider that extends in a planar coiled configuration within the rotational assembly, wherein the spirally wound divider is coupled to the fixed assembly at a first divider end and is coupled to the rotational assembly at a second divider end at the wired output, wherein the spirally wound divider defines a continuous spiral cavity having a single spiral orientation within the rotational assembly, and wherein the spirally wound divider is fixed only at the first and second divider ends and is slidably operable within the rotational assembly to define a flexible configuration of the continuous spiral cavity, wherein the continuous spiral cavity of the spirally wound divider slidably receives a cable assembly that freely moves relative to the spirally wound divider.

20. The utility interface of claim 19, wherein the rotational assembly includes a rotating disk that is configured to rotate about the central axis between a fully rotated clockwise position and a fully rotated counterclockwise position, and wherein an angular distance between the fully rotated clockwise position and the fully rotated counterclockwise position is approximately 720 degrees.

* * * * *